(12) United States Patent
Korngold et al.

(10) Patent No.: US 6,913,696 B1
(45) Date of Patent: Jul. 5, 2005

(54) SEPARATION OF COMPONENTS OF ORGANIC LIQUIDS

(75) Inventors: Emanuel Korngold, Beer Sheva (IL);
Elisheva Zisner, Ra'anana (IL);
Reuven Wachs, Jerusalem (IL)

(73) Assignee: Pervasiv LTD, Ashkelon (IL)

( * ) Notice: Subject to any disclaimer, the term of this patent is extended or adjusted under 35 U.S.C. 154(b) by 0 days.

(21) Appl. No.: 10/221,951

(22) PCT Filed: Mar. 16, 2000

(86) PCT No.: PCT/IL00/00168

§ 371 (c)(1),
(2), (4) Date: Sep. 13, 2002

(87) PCT Pub. No.: WO00/57995

PCT Pub. Date: Oct. 5, 2000

(51) Int. Cl.$^7$ ................................................. C02F 1/44
(52) U.S. Cl. .................. 210/640; 210/500.36; 210/638; 210/321.8; 95/45; 95/50
(58) Field of Search ........................... 210/640, 500.36, 210/638, 500.23, 321.8, 644; 264/41, 48, 49; 95/45, 50

(56) References Cited

U.S. PATENT DOCUMENTS

| | | | |
|---|---|---|---|
| 2,046,090 A | | 6/1936 | Reed et al. |
| 3,388,080 A | * | 6/1968 | De Korosy et al. ............ 521/27 |
| 3,847,772 A | * | 11/1974 | Sata et al. ................... 204/520 |
| 3,930,990 A | | 1/1976 | Brun et al. |
| 4,073,754 A | | 2/1978 | Cabasso et al. |
| 4,728,429 A | * | 3/1988 | Cabasso et al. ............. 210/638 |
| 4,798,674 A | | 1/1989 | Pasternak et al. |
| 4,802,987 A | | 2/1989 | Black |
| 4,997,567 A | | 3/1991 | Messalem et al. |
| 5,066,403 A | | 11/1991 | Dutta et al. |
| 5,559,254 A | | 9/1996 | Krug et al. |
| 5,643,968 A | | 7/1997 | Andreola et al. |
| 5,755,967 A | | 5/1998 | Meagher et al. |

FOREIGN PATENT DOCUMENTS

| | | |
|---|---|---|
| GB | 1 412 456 | 12/1972 |
| JP | 58089903 | 5/1983 |
| JP | 58089907 | 5/1983 |
| JP | 61161109 | 7/1986 |
| JP | 4104824 | 4/1992 |

OTHER PUBLICATIONS

PCT Notification of Transmittal of International Preliminary Examination Report; International Application No. PCT/IL00/00168; International Filing Data Mar. 16, 2000; Priority Date Mar. 25, 1999; Date of Mailing Jun. 11, 2001; 1 pg.
PCT International Preliminary Examination Report; Date of Completion of this report, May 15, 2001; 4 pgs.
PCT Notification of Withdrawal of Priority Claim; Date of Mailing Sep. 26, 2001; 1 pg.
PCT Notification of Transmittal of The International Search Report or the Declaration; Data of Mailing Jul. 6, 2000; 4 pgs.
PCT Written Opinion; Date of Mailing Feb. 16, 2001; 5 pgs.
Jeremy M. Ben–David & Co. Ltd., Patent Attorneys, Stanley J. Davis; Letter to IPES/US; Attn. Ms. Ana Fortuna; Dated Mar. 29, 2001; 2 pgs.
PCT Notification of Transmittal of International Preliminary Examination Report; Date of Mailing Oct. 31, 2001; 5 pgs.

* cited by examiner

*Primary Examiner*—Ana Fortuna
(74) *Attorney, Agent, or Firm*—Armstrong Teasdale LLP

(57) ABSTRACT

A pervaporation process for separating organic liquid mixtures of components having differing polarities, uses an ion exchange membrane which comprises a polymerized alkene including pendant groups of formula $SO_2N(R)$—A—QX where R is H or alkyl, A is alkylene, Q is quaternary ammonium, and X is a negatively-charged counter-ion, the sulfur content of the membrane being in the range 3–10 wt. %.

5 Claims, 3 Drawing Sheets

SEPARATION OF COMPONENTS OF ORGANIC LIQUIDS

CROSS REFERENCE TO RELATED APPLICATIONS

This application claims the priority of PCT/IL00/00168 filed Mar. 16, 2000 which is incorporated herein in its entirety by reference.

FIELD OF THE INVENTION

The present invention relates to a pervaporation process for separating the components of organic liquid mixtures, a membrane which may be utilized for this process and a method for making the membrane.

BACKGROUND OF THE INVENTION

Mixtures of organic liquid components are frequently separated at present on a large scale by multistage distillation (rectification), which is characterized by: high energy demands, relatively large capital plant investment, a variety of maintenance problems, and severe environmental problems that contribute to the energy demands. For example, high temperature multistage distillation increases thermal loads on the cooling system of a chemical plant and generally contributes to water and air pollution, while regulations, which are designed to mitigate these problems, often constitute an additional energy burden on the separation process.

The need to use energy efficiently, and to conserve resources, have focused attention on by-products of the chemical and petroleum industries. Most of these by-products consist of mixtures of liquid organic compounds, whose separation is often complicated and costly. Some of the by products have been considered, until recently, as expendable and disposable, or were burned to provide an expensive energy source. The development of a low-cost technique of separating such mixtures would clearly be of great benefit.

Separation processes which involve the use of porous and/or semi-permeable membranes for separating compounds from each other have been used increasingly in recent years. Whereas conventional techniques such as distillation, adsorption, liquid-liquid extraction and crystallization are often relatively inadequate and uneconomical, application of membrane technology can save in process costs because energy consumption is low, and raw materials can be recovered and reused. Moreover, the process can be carried out continuously, and disposal problems can be reduced or eliminated.

Membrane permeation by the pervaporation process involves selective sorption of a liquid mixture into a membrane, diffusion through the membrane, and desorption into a vapor phase on the permeate side of the membrane. Because of the interesting potential applications of pervaporation techniques, for example, to the separation of organic liquid mixtures, attempts have been made to discover commercially acceptable membranes, and numerous studies dealing with separating organic liquids using pervaporation processes have been reported.

U.S. Pat. No. 4,073,754 (Cabasso et al.) describes the use of pervaporation membranes for separation of aromatic hydrocarbons such as benzene, cyclohexane, ethanol, from other organic solvents, e.g., aliphatic hydrocarbons such as cyclohexane, decalin, heptane. The membrane materials employed consisted of a polymer alloy of poly (vinylidenechloride-benzyldiethyl phosphone) copolymer and acetyl cellulose; a phosphonylated poly(phenylene) oxide derivative and acetyl cellulose; and poly(2-methyl-6-methylenedimethyl phosphonate-3-bromo-1, 4-phenylene) oxide.

U.S. Pat. No. 4,728,429 (Cabasso, et al.) describes a membrane permeation process for dehydration of organic liquid mixtures using sulfonated ion-exchange polyalkylene membranes, and in particular a pervaporation process where the membrane is prepared by free radical reaction of chlorine and sulfur dioxide with a linear polyalkylene and subsequently either hydrolyzing the produced chlorsulfonated polyalkylene giving a cation-exchange sulfonated polyalkylene, or treating the chlorsulfonated polyalkylene with an amine followed by quaternization, to give an anion-exchange sulfonated polyalkylene, the membrane being between about 25% and about 75% amorphous in structure and having a charge density between about 0.2 meq/g and about 4.5 meq/g.

In U.S. Pat. No. 4,798,674 (Pasternak, et al.), there is described a method for concentrating an aqueous charge solution containing (i) an alcohol having 1 or 2 carbon atoms and (ii) an oxygenate selected from organic ethers, aldehydes, ketones, and esters, by contact with the high pressure side of a non-porous membrane separating layer, across which a pressure drop is maintained, and which is selected from (i) polyvinyl alcohol which has been crosslinked with an aliphatic polyaldehyde containing at least three carbon atoms including those in said aldehyde groups; and (ii) high molecular weight ion exchange resin in membrane form having carbon atoms in the backbone bearing a pendant acid group, which membrane has been contacted with a quaternary ammonium salt containing four hydrocarbyl groups; whereby a lean mixture containing relatively more alcohol and less oxygenate is recovered as permeate from the low pressure side of the non-porous separating layer, and a rich mixture containing relatively less alcohol and more oxygenate is recovered as retentate from the high pressure side of the non-porous separating layer.

In U.S. Pat. No. 4,997,567 (Messalem et al.), there is described a permselective, dimensionally stable, ion-exchange membrane, which selectively separates ions of opposite electric charges passing therethrough, the membrane being an activated polymeric film matrix incorporating fixed anionic and/or cationic groups, in which augmented dimensional stability is provided by an integral network of an inert unactivated polymeric film.

U.S. Pat. No. 5,066,403 (Dutta et al.) relates to a composite membrane containing ion-exchange groups, which may be used for separating azeotropic mixtures and close-boiling liquid mixtures by pervaporation, and which is made by casting perfluorosulfonic acid polymer (i.e. containing a fluorocarbon backbone and sulfonic groups) on a porous matrix of polytetrafluoroethylene (PTFE). JP 58089907 and JP 58089903 describe, respectively, an ion-exchange pervaporation membrane made from fluorinated olefin/fluorovinylpolyether/fluorovinylmonoether terpolymer, and such a membrane where ion exchange capacity changes in the thickness, made from fluorovinyl monomer and fluorovinyl carboxylic monomer.

U.S. Pat. No. 5,643,968 (Andreola et al.) relates to ion-exchange membranes used for a variety of processes including pervaporation, and which are made from a soluble graft copolymer containing a backbone of a first polymer having a main chain containing aromatic rings, and a polymerizable vinyl or ring-containing compound, displaying or convertible to ion-exchange functionality, grafted onto the first polymer.

U.S. Pat. No. 5,755,967 (Meagher et al.) describes the selective removal of acetone and/or butanol from aqueous solutions and mixtures thereof, by a pervaporation process using a membrane comprising silicalite particles embedded in a polymer matrix.

Composite ion-exchange pervaporation membranes are described in JP 61161109 and JP 4104824.

Numerous pervaporation membranes have been described for separating organic liquid components which are not ion-exchange membranes. By way of example, in U.S. Pat. No. 3,930,990 (Brun et al.), components of hydrocarbon mixtures are separated, e.g. by pervaporation through membranes, e.g. from butadiene-acrylonitrile copolymer, comprising groups which complex with one hydrocarbon component. In U.S. Pat. No. 4,802,987 (Black), aromatic hydrocarbons are separated from a mixture with non-aromatic compounds by selective permeation through a polyethylene glycol impregnated regenerated cellulose or cellulose acetate membrane. In U.S. Pat. No. 5,559,254 (Krug et al.), methanol and tetrahydrofuran are separated by pervaporation using, as an organophilic/hydrophilic membrane, a plasma polymerization membrane.

It will be evident to the skilled person that recent developments in the pervaporation art concern, on the one hand, ion exchange membranes from fluorinated polymers, more complex polymers such as graft polymers, or such membranes which are composites (e.g., impregnated or laminated), or, on the other hand, membranes for pervaporation which are not ion exchange membranes at all.

Persons skilled in the art will also be aware that there exist multipurpopervaporation membranes as well as such membranes which are applied for a single purpose, e.g. to separate particular organic mixtures, or to dehydrate mixtures of organic liquids with water. Where a pervaporation membrane has been disclosed solely for such dehydration, it would be unlikely that it could also be applied to the separation of components of organic liquid mixtures, for the following reason. Water is believed to diffuse efficiently through an ion exchange membrane via ion hydration shells, whereas the mechanism of diffusion of an organic liquid must be different from water, because such liquid cannot replace water in the ion hydration shells, and it would rather be expected to diffuse through the polymer phase.

The present inventors have surprisingly found that a modification of an ion exchamge pervaporation membrane, such as is disclosed in U.S. Pat. No. 4,728,429 exclusively for the purpose of dehydration of aqueous organic liquid mixtures, can be utilized effectively for separation of organic components of organic liquid mixtures from each other.

The entire contents of the above-mentioned patents or published patent applications are incorporated by reference herein.

It is an object of this invention to provide a simple and effective process for selectively separating organic liquid components from their mixtures.

Another object of the present invention is to provide a membrane pervaporation technique employing permselective polymer membranes for efficiently separating organic liquid components from their mixtures.

Still another object of the present invention is to provide membrane pervaporation techniques which can be used to achieve almost complete separation of organic liquid components from their mixtures in one stage.

Additional objects and advantages of the invention will become apparent from the description which follows.

SUMMARY OF THE INVENTION

In one aspect, the present invention provides a pervaporation process for partial or essentially complete separation of the components of a feed mixture comprised of organic liquids using a homogeneous polymeric membrane having an upstream side and a downstream side, which process comprises the steps of: contacting the feed mixture with the upstream side of the membrane whereby a component of the mixture having a relatively higher polarity or the mixture enriched in this component is selectively sorbed into the upstream side of the membrane and selectively diffuses to the downstream side of the membrane; desorbing the component having a relatively higher polarity or the mixture enriched in this component from the downstream side of the membrane; and recovering a component the mixture having a relatively lower polarity or the mixture enriched in this component from the upstream side of the membrane; wherein the membrane comprises a polymerized alkene including pendant groups of formula $SO_2N(R)$—A—QX where R is H or alkyl, A is alkylene, Q is quaternary ammonium, and X is a negatively-charged counter-ion, the sulfur content of the membrane being in the range of from about 3 to about 10 wt. %; provided that at least two the components of the feed mixture have polarities which differ from each other.

In another aspect, the invention provides a membrane which comprises a polymerized alkene including pendant groups of formula $SO_2N(R)$—A—QX where R is H or alkyl, A is alkylene, Q is quaternary ammonium, and X is a negatively-charged counter-ion, the sulfur content of the membrane being in the range of from about 3 to about 10 wt. %, and the membrane being preferably characterized also by at least one of the following features (A) and (B), namely: (A) the membrane includes a central portion and at least one edge portion, such that in the at least one edge portion the concentration of the pendant groups is significantly less than in the central portion; (B) the chlorine content of the membrane is in the range of from about 1 to about 25 wt. %.

In yet another aspect, the invention provides a method for preparing a membrane as just defined, which comprises reacting, in the liquid or gas phase, chlorine and sulfur dioxide with a linear poly ($C_{2-18}$ alkene) in the desired configuration, in the presence of light and optionally also a free radical initiating catalyst, to produce a chlorsulfonated poly ($C_{2-18}$ alkene), which is then reacted with a diamine of formula HN(R)—A—NR'R", to produce an intermediate poly ($C_{2-18}$ alkene) containing pendant groups of formula $SO_2N(R)$—A—NR'R", the latter pendant groups then being quaternized if desired to obtain the desired membrane containing pendant groups of formula $SO_2N(R)$—A—QX, where R is H or alkyl, R' and R" are each independently alkyl, A is alkylene, Q is quaternary ammonium, and X is a negatively-charged counter-ion, wherein the liquid or gas phase reaction conditions and the proportions of chlorine and sulfur dioxide are such that the membrane containing the pendant groups has a sulfur content in the range of from about 3 to about 10 wt. %, and preferably that at least one of the following two further conditions is fulfilled, namely: the conditions and proportions are such that the membrane containing the pendant groups has a chlorine content in the range of from about 1 to about 25 wt. %; and/or in the reaction with chlorine and sulfur dioxide, at least one edge portion of the polyalkene membrane is masked from the action of light whereby the non-masked part of the membrane is predominantly subjected to chlorosulfonation, while the at least one edge portion of the membrane is subjected to a lesser degree of chlorosulfonation.

In still further aspects, the present invention provides a membrane which has been prepared according to the method recited in the preceding paragraph, as well as a pervaporation process for partial or essentially complete separation of the components of a feed mixture comprised of organic liquids, using such a membrane.

DETAILED DESCRIPTION OF THE INVENTION

Figure 1:
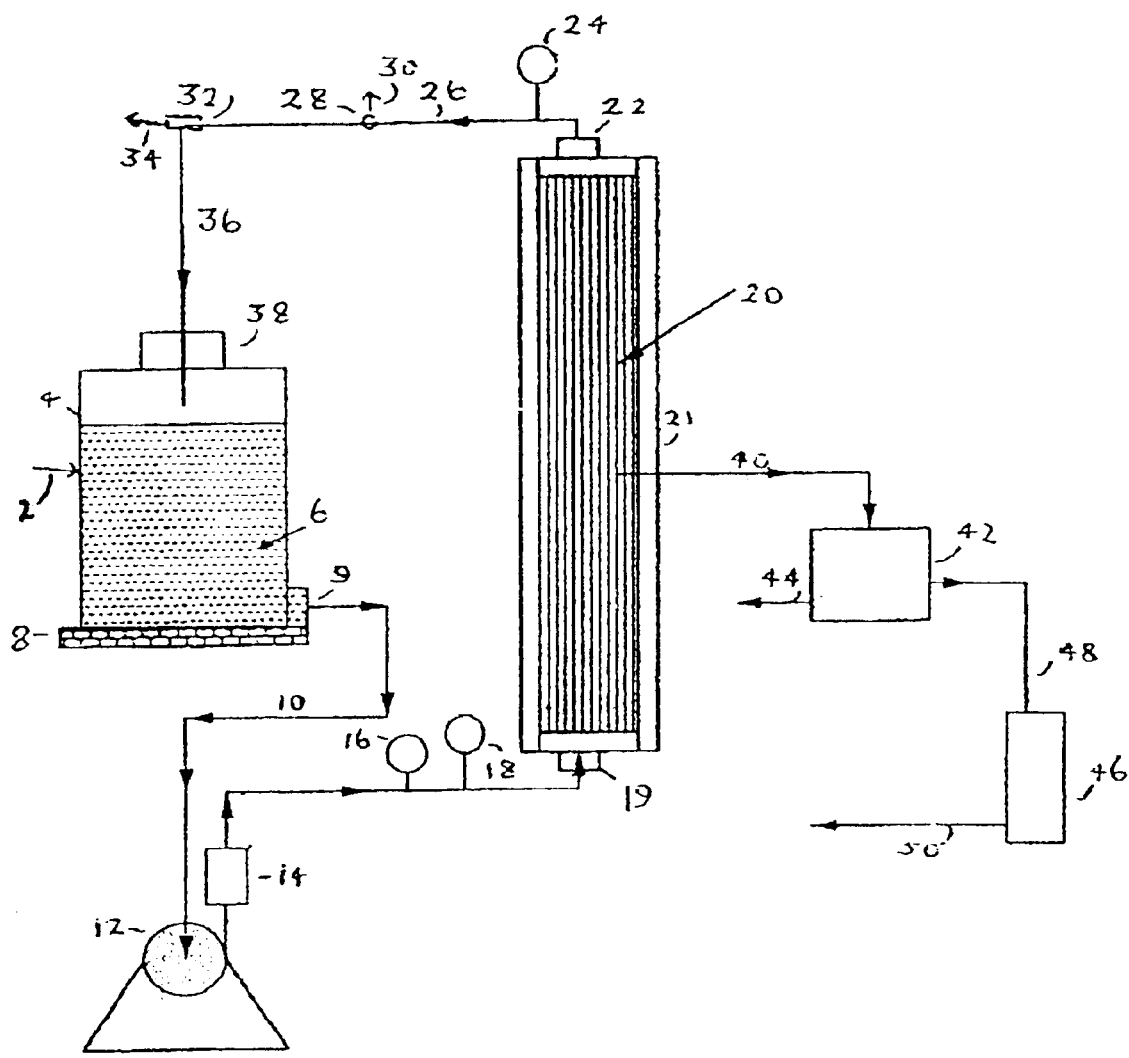
FIG. 1 illustrates in section, apparatus for separation of components of organic liquids by pervaporation in accordance with an embodiment of the present invention.

In contradistinction to the membranes described in U.S. Pat. No. 4,728,429, in which the sulfur content of the chlorosulfonated membranes (and hence, as an approximation, of the membranes derived therefrom), was 1–2.5 wt. %, it has been discovered in accordance with the present invention, that membranes, containing the pendant groups described herein, which contain from about 3 to about 10, preferably from about 3 to about 8 wt. % sulfur, are of particular utility. In relation especially to the separation processes described herein, where the sulfur content is less than about 3 wt. %, the flux is too low for the membrane to be of any practical utility, whereas where the sulfur content is more than about 10 wt. %, then the membrane swells greatly in organic solvents and is therefore impractical to use.

Moreover, it has been discovered in accordance with the present invention, that membranes, containing the pendant groups described herein, are of particular utility when they contain about 1 to about 25, preferably about 1 to about 10 and more preferably from about 1 to about 5 wt. % chlorine. Such membranes containing the higher proportions of chlorine are mechanically weak and tend to more readily decompose.

In accordance with the present invention, liquid mixtures of organic components are separated by a pervaporation process, components having relatively higher polarities (as manifested for example by higher dielectric constants) being selectively absorbed by the pervaporation membrane to obtain a permeate, enriched in such relatively higher polarity component and a retentate which compared with the feed mixture contains a diminished proportion of the relatively higher polarity component.

As will be apparent to persons of the art, hydrocarbons will in general have a low polarity when compared with almost any organic compound containing a functional group, and, in a mixture of hydrocarbon with such organic compound, the latter will be found preferentially in the permeate and the hydrocarbon will be found preferentially in the retentate. In the case of separation by pervaporation of mixtures of organic compounds, each or all of which contain functional groups, it will of course be a component of relatively higher polarity which will appear preferentially in the permeate, and a component of relatively lower polarity which will appear preferentially in the retentate.

Suitable organic compounds which may be separated in accordance with the present invention from liquid mixtures containing them, are believed to include alcohols, ethers, carboxylic acids, aldehydes, ketones, acid chlorides, anhydrides, amides, esters, sulfonic acids, amines, phenols, aryl halides, glycols, dicarboxylic acids, keto acids, hydroxy acids, $\alpha,\beta$-unsaturated carbonyl compounds, and carbohydrates.

The combination of sulfonamide and quaternary ammonium groups contributes to the high selectivity of the membrane. The membranes employed in our process have, after initial chlorosulfonation of polyalkenes, a high concentration of $SO_2Cl$ groups leading to a high concentration of sulfonamide and quaternary ammonium groups. This allows the component of the organic feed mixture having the higher polarity to pass selectively through the membrane.

The linear polyalkene which may be chlorosulfonated is, in general, a poly($C_2$–$C_{18}$ alkene). Examples of such polyalkenes include polyethylene, polypropylene, polybutylene, polyisobutylene, poly(1-butene), poly(3-methyl-1-butene), poly(1-pentene), poly(4-methyl-1-pentene), poly(1-hexene), poly(4-methyl-1-hexene), poly(5-methyl-1-hexene), poly(1-heptene), poly(5-methyl-1-heptene), poly(1-decene), poly (1-dodecene), poly(1-tetradecene), poly(1-hexadecene), poly(1-octadecene), and the like. Preferred is a linear polyethylene. For illustrative purposes, the polyalkene membrane used in the process of this invention will be described with reference to polyethylene.

The membranes used in the process of this invention are derivatives of chlorosulfonated polyalkenes (polyalkylenes), such as chlorosulfonated polyethylene, which—stated elsewhere herein—have been reacted with a diamine of formula HN(R)—A—NR'R", in which R' and R" are each independently alkyl, to produce an intermediate poly ($C_{2-18}$ alkene) containing pendant groups of formula $SO_2N(R)$—A—NR'R", the intermediate poly ($C_{2-18}$ alkene) then being quaternized if desired to obtain the desired (anionic) membrane containing pendant groups of formula $SO_2N(R)$—A—QX.

In general, processes for the chlorosulfonation of polyalkylenes, such as polyethylene, follow the principles of the so-called Reed process for the chlorosulfonation of hydrocarbons, described in U.S. Pat. No. 2,046,090 to Reed et al., the disclosure of which is incorporated herein by reference. The reaction is carried out in an anhydrous solvent (generally carbon tetrachloride) and the reacting agents are chlorine and sulfur dioxide. Sulfuryl chloride also may be used as an equivalent reagent. The reaction is a free-radical process and can be catalyzed by light, e.g. ultraviolet radiation and/or by radical sources, such as organic peroxides or azobisisobutyronitrile. The chlorosulfonation reaction is generally carried out at temperatures required to dissolve the polymer in the solvent. Superatmospheric pressures are often employed to achieve this result. The reaction is allowed to proceed until the chlorine content of the polymer is generally in the range of 20–45% and the sulfur content of the polymer is in the range of 1–2.5%.

After reaction, the polymer is isolated by any of several different techniques. If the polymer solution is steam distilled in the presence of surface-active materials, granular crumb-like particles can be obtained which may be dried by any conventional method. Alternatively, the polymer may be isolated as a reticulated film by evaporating the solvent from a thin film of solution on a smooth metal surface.

The preparation of permselective membranes for use in electrodialysis, by a method which includes a step of chlorosulfonating polyolefin films in the gas phase, is described in De Korosy et al., U.S. Pat. No. 3,388,080, incorporated herein by reference. In general, e.g., polyethylene may be reacted with $SO_2$ and $Cl_2$ to produce pendant sulfonyl chloride groups on the polyethylene which are then treated as desired, for example with $(CH_3)_2N(CH_2)_3NH_2$, where the tertiary amine group may be subsequently quaternized, e.g. with $CH_3Br$.

The preparation in the liquid phase of chlorsulfonated polyethylene films is described in Bikson; "Morphology and Properties of Heterogeneously Chlorsulfonated and Chlorinated Polyethylenes"; PhD Thesis submitted to the Weizmann Institute of Science, Rehovot, Israel; October, 1980; incorporated herein by reference.

Polyalkene (e.g. polyethylene) films, tubes, or hollow fibers, for example, may be chlorosulfonated by bringing them into contact with a carbon tetrachloride solution saturated with sulfur dioxide/chlorine gaseous mixture ($SO_2/Cl_2$ ratio of 2.5:1). See Vofsi et al., British Pat. No. 1,412,456. The reaction temperature is kept at 15° C. and methylethyl ketone hydroperoxide initiator is added continuously.

High flux, high selectivity, and good physical and chemical stability are obtained by applicants' membrane. Such properties depend, in general, largely on the nature and composition of the pendant groups and the matrix backbone, and possibly also on one or more of: the balance of the hydrophilic and the hydrophobic content; degree of cross-linking and entanglement; porosity and asymmetry, if any; and physical and chemical post-treatments such as annealing, compression, and high-energy irradiation.

The present derivatized polyalkene (e.g., polyethylene) membranes are desirably at least about 20%, preferably between about 25% and 75%, and more preferably between about 30% and 60% amorphous in structure. This is because the amorphous section of a polyalkene can be sulfonated, which is not the case with the crystalline (hard) section of a polyalkene.

The membranes for use according to the invention can be prepared in a known manner from casting or spinning solutions by casting films or by spinning to give tubing or hollow fibers. Thermoplastic polyalkenes such as polyethylenes can be brought into the desired membrane form by the known methods of thermoplastic processing technology, such as extruding, calendering or injection molding, dry and wet spinning and casting. These manufacturing processes are well known in the art.

In general, thinner membranes permit higher rates of permeation. However, since the sulfonated ion-exchange polyalkene (polyalkylene) membranes used in applicants' invention can have very high intrinsic permeability, it is not necessary to make the membranes as thin as possible. However, as is known, the membranes must have adequate strength and stability so that they can be handled and no fractures or weak points arise during use. Preferably, therefore, the thickness of the membranes according to the invention is between about 5 and 500 microns and preferably between about 10 and 100 microns.

Membranes of this type can be supported by any known supporting substrate in the appropriate structural forms, for the process according to the invention. Hollow fibers do not require a supporting substrate.

The membranes may be used in the form of films, tubes, tubing or hollow fibers in order to increase surface area and in order to achieve a maximum membrane surface area per unit volume, thus permitting the use of small apparatuses. Separation units of this type, which also are termed "modules," are known. Membranes made from hollow fibers and used in this invention preferably have a diameter between about 50 and 1000 microns and a wall thickness in the range of about 5–200 microns. Membranes made from tubes and used in this invention have a diameter between about 1000 microns and 4 cm.

Without prejudice to the generality of being able to use the membranes in any suitable form, it is presently preferred to utilize hollow fibers, which are most preferably in the form of modules. Potting of hollow-fiber membranes to produce modules must be done with materials of high chemical stability and high adhesion to the hollow fiber membrane. Swelling of the membrane in different concentrations of solvent, and in different solvents, is—in general terms—a major problem. In our invention, sulfochlorination along the end portions of hollow fibers destined for potting is avoided by masking, as for example by covering each of the end portions with a black sheet to cut out light. This method assures a low concentration of sulfonyl groups along the end portions of the fibers, thereby substantially reducing swelling of fiber ends after amination and quaternization. The poor adhesion of e.g. polyethylene to any known adhesive is well known. The quantity of sulfonyl groups introduced into the polyethylene hollow fibers in spite of shading of the end portions is small and does not cause membrane swelling, thus promoting good adhesion between the potting material and the polyalkene (e.g. polyethylene) hollow fibers. The advantage of the present anion-exchange polyalkene hollow fibers over other membranes, such as cation exchange polyalkene hollow fibers, for the separation of components of mixtures of organic liquids is the presence of a combination of sulfonamide and a quaternary ammonium group which assures a high level of separation of components of close boiling organic liquid mixtures, as well as high chemical stability.

The process according to the invention can be carried out, as known in the art, both discontinuously and continuously and, likewise, in one stage or several stages, for example, in the form of a separation cascade with any desired number of separating stages. Also, the process according to the invention can be combined with a conventional distillation process for economy, e.g., by shifting from distillation to the process of this invention when the separation of the feed mixture has reach a certain predetermined level.

Reference will now be made to the drawings, which illustrate particular embodiments of the invention.

In FIG. 1, a mixture of components which it is desired to separate is fed through line 2 into reservoir 4, supported on plinth 8 containing heating elements (not shown) for heating the mixture. The mixture is circulated generally in the directions of the arrows via reservoir exit port 9 and line 10 by pump 12, the liquid being conducted via flowmeter 14, pressure gauge 16, temperature gauge 18 and entry port 19 to the upstream side of the membrane in the form of hollow fibers 20, held in stainless steel container 21. The mixture, depleted of the component of high polarity (which has been absorbed on the membrane), i.e. the retentate, exits container 21 via port 22 and line 26 which incorporates temperature gauge 24. Valve 28 enables the retentate to be sampled via line 30, so that, if desired (e.g. if it is determined that that the retentate has a desired degree of purity), this can be withdrawn from the system via valve 32 and line 34. Alternatively, the retentate may be recirculated to reservoir 4 via line 36 and entry port 38. The permeate is withdrawn from the downstream side of the membrane via line 40 and cooling trap 42, and may be drawn off via line 44, the withdrawal of permeate being actuated by vacuum pump 46 via line 48, pump 46 exhausting to atmospheric pressure via line 50.

Figure 2:
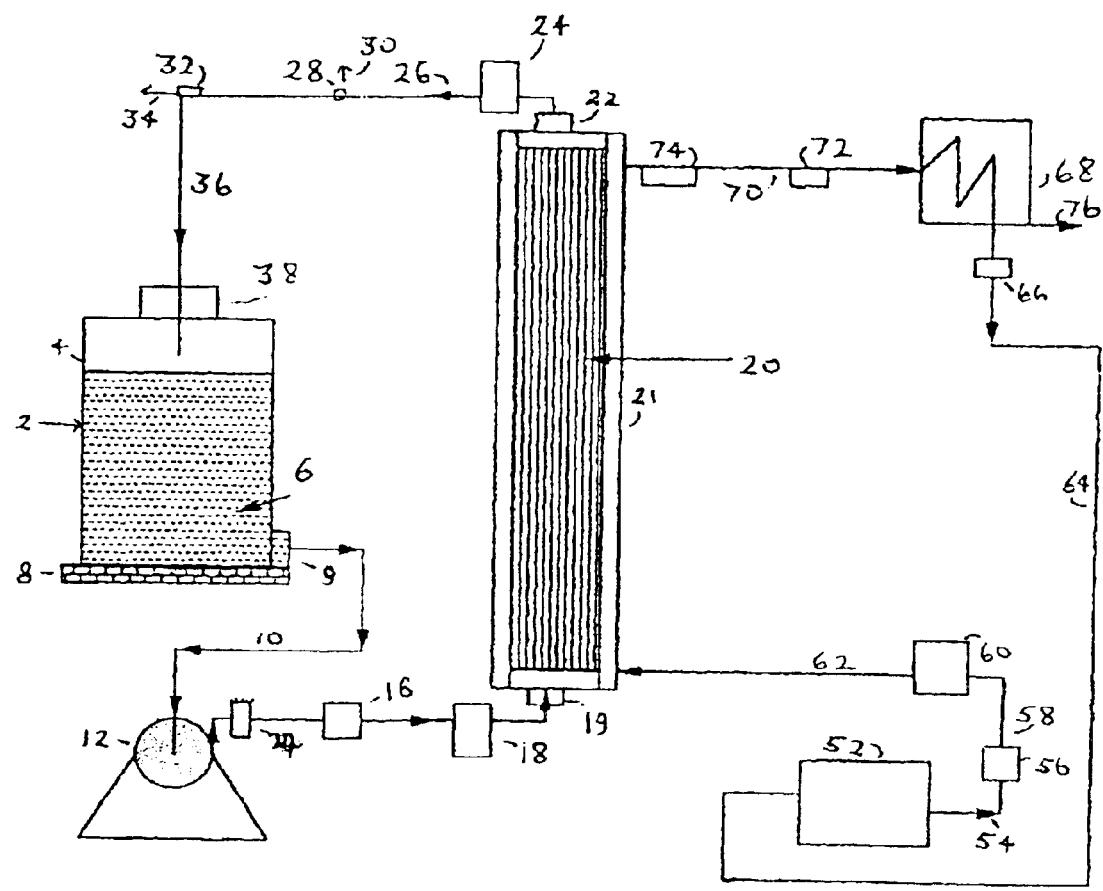
FIG. 2 illustrates in section, apparatus for separation of components of organic liquids by pervaporation in accordance with another embodiment of the present invention.
Figure 3:
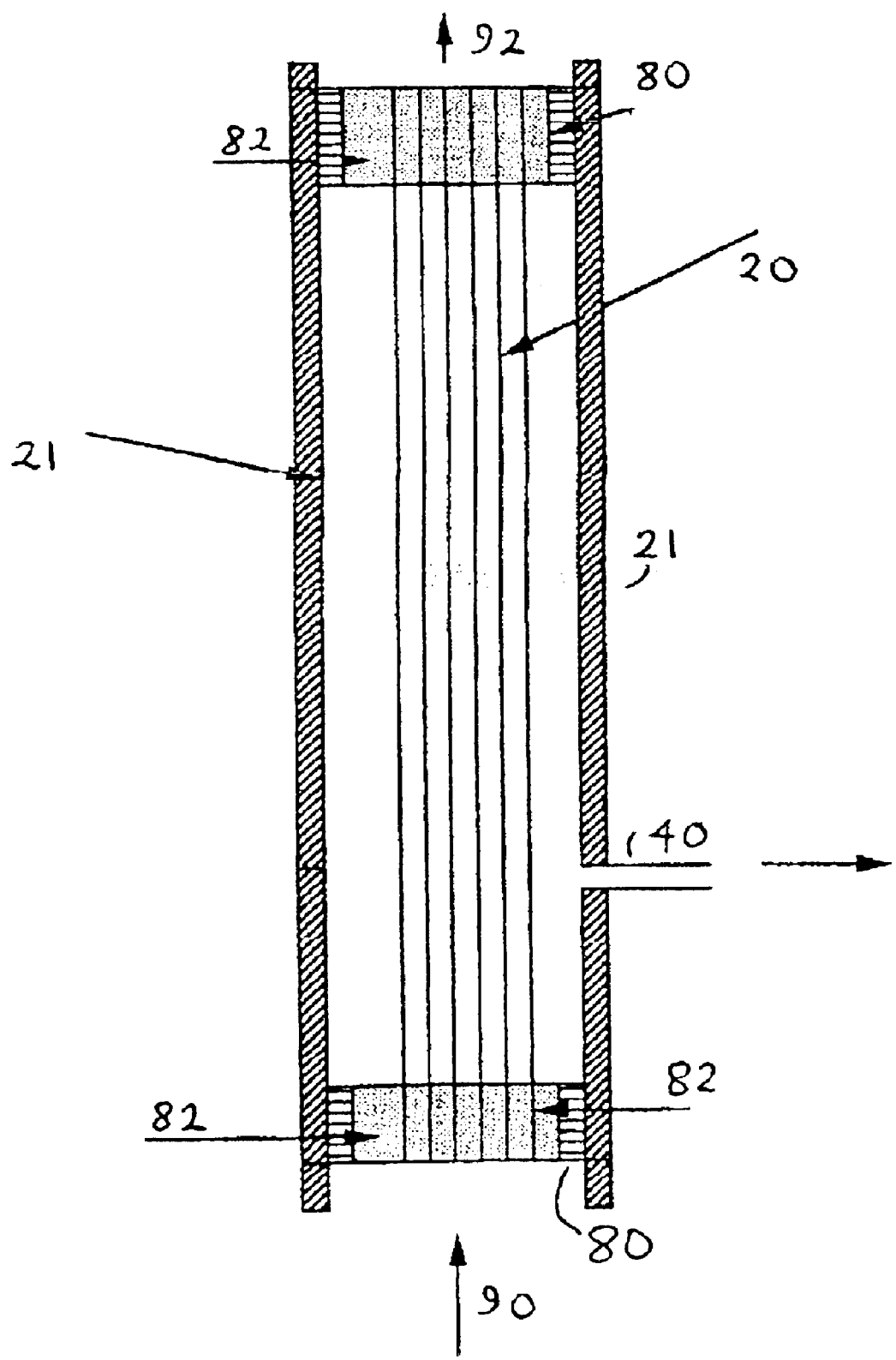
FIG. 3 illustrates in section, a hollow fiber module for use in apparatus for separation of components of organic liquids by pervaporation in accordance with an embodiment of the present invention.

In FIGS. 2 and 3, identical reference numerals have the same meaning as in FIG. 1. FIG. 2 illustrates an embodiment of the invention in which recycled air sweep is used to withdraw permeate from the system, in place of the vacuum utilized in the embodiment illustrated in FIG. 1.

Thus, in FIG. 2, air blower 52 forces air via line 54, flowmeter 56, line 58, manometer 60 and line 62 into contact with the downstream side of membrane 20, simultaneously drawing air via line 64, temperature gauge 66, cooling coil chamber 68, and line 70—which incorporates temperature and pressure gauges, 72 and 74, respectively—from the down streamside of membrane 20. The effect of this circulation of air is that while the air stream is itself recycled, permeate is swept from the membrane and accumulates in chamber 68, from which it may be withdrawn as and when desired, via line 76.

FIG. 3 shows further detail of the hollow fiber container or module 21. After polyethylene hollow fibers had been subjected to chlorosulfonation and subsequent reaction with (tertiaryamino)alkylamine and then quaternization (see Example 1 below), 25 such fibers were potted at each end (i.e. essentially along most or all of the length of each fiber end which was significantly less chlorosulfonated than the central portion of each fiber) in potting tube 80 with epoxy resin as potting material 82. When in use, the mixture of components for separation enters the module at its foot as shown by the arrow 90 and retentate exits at its head as shown by arrow 92, while permeate exits via line 40.

Since chlorosulfonation (and subsequent derivatization of the chlorosulfonyl groups) produces a membrane which is recognizably of diminished mechanical strength in comparison with unreacted polyalkene (e.g. polyethylene), it is believed that the embodiment of the present invention in which the membrane is significantly less chlorosulfonated at its edges (or at the ends of an elongate membrane such as a hollow fiber membrane) is advantageous in that the membrane can be held in a frame or module at its edges (or ends), so that optimal adhesion and strength can be attained when potting, whereby the membrane has a much longer life than would otherwise be the case. It is believed that this advantage is supported by Example 5, below.

Specific embodiments illustrating the mode of preparation, formulation and application of the membranes useful in the invention are set forth below. In these exemplary illustrative separations, the objective was to deplete a binary feed mixture with respect to its methanol or ethanol content, and correspondingly enrich the other component of the mixture.

EXAMPLE 1

Anion-exchange hollow fibers were prepared by chlorosulfonation at 20° C. of polyethylene hollow fibers, using an approximately 8:1 sulfur dioxide: chlorine weight ratio, under influence of actinic radiation, while 10 cm of each end of the fibers was masked with black plastic, in order to significantly reduce chlorosulfonation at each end-section, in comparison with reaction in the central section of the fibers. Chlorosulfonation was followed by amination with 3-dimethylaminopropylamine and subsequent quaternization with a solution containing 25% methyl bromide and 75% dimethylformamide at 20° C. The resultant anionic membrane was characterized by pendant groups containing both sulfonamide and quaternary ammonium. The dimensions of the hollow fibers were: length 140 cm, wall thickness 100 microns, diameter 1.0 mm. Strong base capacity was 1.1 meq/dry g, sulfur content 6.2%, chlorine content 2.5%, nitrogen content 6.1%. Sulfur and chlorine content on each 10 cm end-section were 1.5% and 0.3%, respectively. Swelling in methanol of the hollow fiber as a whole was 20.5%, as compared with less than 1.5% along the edges. The anion-exchange hollow fibers were potted with epoxy resin at both ends to prepare a module of 25 hollow fibers (see FIG. 3).

Vacuum pervaporation was carried out with an organic mixture of 96.0% MTBE and 4.0% methanol at a temperature of 38.30° C. (see FIG. 1). The dielectric constants MTBE and methanol are 4.5 and 32.6, respectively, and their boiling points are 52.7° C. and 65.0° C., respectively. The retentate composition was 99.98% MTBE and 0.02% methanol, while the permeate composition was 25.4% MTBE and 74.6% methanol. The calculated selectivity factor was 96×74.6/(4×25.4)=70.5. The flux of methanol was 14.0 g/h/m$^2$.

EXAMPLE 2

A module of 67 anion-exchange hollow fibers prepared as in Example 1, but having a fiber wall thickness of 40 microns, was used to separate at 47° C. a mixture of 95.8% hexane (dielectric constant 1.9, boiling point 68° C.) and 4.2% methanol. The composition of the permeate was 87.8% methanol and 12.2% hexane. The calculated separation factor was 164.1. The flux of methanol was 333 g/h/m$^2$. When the concentration of the methanol in the retentate was reduced to 2.9%, its concentration in the permeate was 93.0% and the separation factor was 449. The final retentate composition was 97.8% hexane and 2.2% methanol.

EXAMPLE 3

The module prepared in Example 1 was used to separate a mixture of 53.4% ethyl acetate (dielectric constant 6.0, boiling point 77.1° C.) and 46.6% methanol at 47.40° C. Permeate concentration was 79.6% methanol and 20.4% ethyl acetate. The separation factor was 4.47. The methanol flux was 81.6 g/h/m$^2$. The final retentate composition was 56.15% ethyl acetate and 43.85% methanol.

EXAMPLE 4

The module prepared in Example 1 was used to separate a mixture of 78.0% hexane and 22.0% ethanol (dielectric constant 24.3, boiling point 78.5° C.) at 48.5° C. Permeate concentration was 32% hexane and 68% ethanol. The calculated separation factor was 7.5. The ethanol flux was 9.1 g/h/m$^2$. The final permeate concentration was 78.97% hexane and 21.03% ethanol.

EXAMPLE 5

An accelerated stability test was carried out with the anion-exchange polyethylene hollow fiber membrane prepared in Example 1 and, for comparison, with a cation-exchange hollow fiber membrane manufactured by hydrolysis in 4% NaOH of a chlorosulfonated polyethylene hollow fiber membrane. The two membranes were immersed in deionized water at 50° C. Whereas the cation-exchange membrane disintegrated after one week, the anion-exchange membrane of the invention was stable over more than six months.

EXAMPLE 6

The module of 25 anion-exchange hollow fibers prepared as in Example 1 was used to separate at 47.50° C. a mixture of 48% hexane and 52% methanol. The module operated for 180 hours without failure. A similar module which was prepared using a homogeneously chlorosulfonated membrane (no masking of light in chlorosulfonation), used for the same separation at the same temperature, began leaking at the junction of unpotted and potted hollow fibers, after only 35 hours. This Example demonstrates the advantage of masking from light the ends of the hollow fibers during the chlorosulfonation reaction, in accordance with an embodiment of the present invention.

EXAMPLE 7

When the procedure of Example 1 was followed in the preparation of an anion-exchange hollow-fiber membrane, but effecting chlorosulfonation at 20° C. of polyethylene hollow fibers, using an approximately 2:1 sulfur dioxide: chlorine weight ratio, under influence of actinic radiation, the product containing the recited pendant groups had a sulfur content 6.1%, and a chlorine content 19.6%. This membrane was tested for swelling by immersion in water at 50° C. for 44 days, during which period the swelling increased from 24.2 to 37.0%. The membrane prepared according to Example 1, which contained 2.5% chlorine, when submitted to the same test, had a constant swelling of 20.5% throughout the whole test period. This Example demonstrate the advantageous swelling properties of membranes prepared in accordance with an embodiment of the invention, containing about 1 to about 10 and more preferably from about 1 to about 5 wt. % chlorine.

While the present invention has been particularly described with reference to certain embodiments, it will be apparent to those skilled in the art that many modifications and variations may be made. The invention is accordingly not to be construed as limited in any way by such embodiments, rather its concept is to be understood according to the spirit and scope of the claims which follow.

What is claimed is:

1. A pervaporation process for partial or essentially complete separation of the components of a feed mixture comprised of organic liquids using a homogeneous polymeric membrane having an upstream side and a downstream side, which process comprises the steps of:

contacting said feed mixture with the upstream side of the membrane whereby a component of the mixture having a relatively higher polarity or said mixture enriched in this component is selectively sorbed into said upstream side of the membrane and selectively diffuses to the downstream side of the membrane;

desorbing said component having a relatively higher polarity or said mixture enriched in this component from said downstream side of the membrane; and recovering a component of the mixture having a relatively lower polarity or said mixture enriched in this component from said upstream side of the membrane;

wherein said membrane comprises a polymerized alkene including pendant groups of formula $SO_2N(R)$—A—QX where R is H or alkyl, A is alkylene, Q is quaternary ammonium, and X is a negatively-charged counter-ion, the sulfur content of said membrane being in the range of from about 3 to about 10 wt. %;

provided that at least two said components of said feed mixture have polarities which differ from each other.

2. A process according to claim 1, which is further characterized by at least one of the following features:

(a) said negatively charged counter-ion is selected from halide, oxide, an acidic moiety and OH;

(b) said membrane is at least 20% amorphous in structure;

(c) the configuration of said membrane is selected from a planar configuration having a thickness between about 5 microns and about 500 microns; a plurality of hollow fibers each having a diameter between about 50 microns and about 1000 microns, said hollow fibers having a wall thickness in the range of about 5–200 microns; and a plurality of tubes, each having a diameter between about 1000 microns and about 4 cm;

(d) said polymerized alkene is selected from polyethylene, polypropylene and polybutylene, and mixtures thereof;

(e) said membrane has been prepared by reacting, in the liquid or gas phase, chlorine and sulfur dioxide with a linear poly ($C_{2-18}$ alkene) in the desired configuration, in the presence of a free radical initiating catalyst or light or both, to produce a chlorsulfonated poly ($C_{2-18}$ alkene), reacting this with a diamine of formula HN(R)—A—NR'R", in which R' and R" are each independently alkyl, to produce an intermediate poly ($C_{2-18}$ alkene) containing pendant groups of formula $SO_2N(R)$—A—NR'R", said intermediate poly ($C_{2-18}$ alkene) then being quaternized to obtain the desired membrane containing pendant groups of formula $SO_2N(R)$—A—QX;

(f) an acceptor fluid is circulated at the downstream side of the membrane, in order to remove the phase which permeates through the membrane;

(g) said component having a relatively higher polarity is selected from alcohols, ethers, aldehydes, ketones, acid chlorides, amides, esters, optionally substituted carboxylic acids, carbohydrates, sulfonic acids, alkyl halides, aryl halides, phenols and glycols;

(h) said mixture is or comprises an azeotropic mixture of components;

(i) the chlorine content of said membrane comprising said pendant groups is in the range of from about 1 to about 25 wt. %.

3. A process according to claim 1 or claim 2, which is further characterized by at least one of the following features:

(A) said azeotropic mixture comprises methanol/hexane, or methanol/methyl t-butyl ether (MTBE), (B) said desorbing step is carried out by a technique selected from the group consisting of vacuum, gas sweeping, and recycled gas sweeping.

4. A pervaporation process for partial or essentially complete separation of the components of a feed mixture comprised of organic liquids using a homogeneous polymeric membrane having an upstream side and a downstream side, which process comprises the steps of:

contacting said feed mixture with the upstream side of the membrane whereby a component of the mixture having a relatively higher polarity or said mixture enriched in this component is selectively sorbed into said upstream side of the membrane and selectively diffuses to the downstream side of the membrane;

desorbing said component having a relatively higher polarity or said mixture enriched in this component from said downstream side of the membrane; and recovering a component of the mixture having a relatively lower polarity or said mixture enriched in this component from said upstream side of the membrane;

wherein said membrane comprises a polymerized alkene including pendant groups of formula $SO_2N(R)$—A—QX where R is H or alkyl A is alkylene, Q is quaternary ammonium, and X is a negatively-charged counter-ion, provided that at least two said components of said feed mixture have polarities which differ from each other;

and wherein said membrane has been prepared by a method comprising reacting in the liquid or gas phase, chlorine and sulfur dioxide with a linear poly($C_{2-18}$ alkene) in the desired configuration, in the presence of light and optionally also a free radical initiating catalyst, to produce a chlorsulfonated poly ($C_{2-18}$ alkene), which is then reacted with a diamine of formula HN(R)—A—NR'R", to produce an intermediate poly ($C_{2-18}$ alkene) containing pendant groups of formula $SO_2$N(R)—A—NR'R", the latter pendant groups then being quaternized if desired to obtain the desired membrane containing pendant groups of formula $SO_2$N(R)—A—QX, where R is H or alkyl, R' and R" are each independently alkyl, A is alkylene, Q is quaternary ammonium, and X is a negatively-charged counter-ion, wherein the liquid or gas phase reaction conditions and the proportions of chlorine and sulfur dioxide are such that the membrane containing said pendant groups has a sulfur content in the range of from about 3 to about 10 wt. %, and a chlorine content in the range of from about 1 to about 25 wt. %.

5. A pervaporation process for partial or essentially complete separation of the components of a feed mixture comprised of organic liquids using a homogenous polymeric membrane having an upstream side and a downstream side, which process comprises the steps of:

contacting said feed mixture with the upstream side of the membrane whereby a component of the mixture having a relatively higher polarity or said mixture enriched in this component is selectively sorbed into said upstream side of the membrane and selectively diffuses to the downstream side of the membrane;

desorbing said component having a relatively higher polarity or said mixture enriched in this component from said downstream side of the membrane; and recovering a component of the mixture having a relatively lower polarity or said mixture enriched in this component from said upstream side of the membrane;

wherein said membrane comprises a polymerized alkene including pendant groups of formula $SO_2$N(R)—A—QX where R is H or alkyl, A is alkylene, Q is quaternary ammonium, and X is a negatively-charged counter-ion, provided that at least two said components of said feed mixture have polarities which differ from each other;

and wherein said membrane has been prepared by a method comprising reacting, in the liquid or gas phase, chlorine and sulfur dioxide with a linear poly($C_{2-18}$ alkene) in the desired configuration, in the presence of light and optionally also a free radical initiating catalyst, to produce a chlorsulfonated poly ($C_{2-18}$ alkene), which is then reacted with a diamine of formula HN(R)—A—NR'R", to produce an intermediate poly ($C_{2-18}$ alkene) containing pendant groups of formula $SO_2$N(R)—A—NR'R", the latter pendant groups then being quaternized if desired to obtain the desired membrane containing pendant groups of formula $SO_2$N(R)—A—QX, where R is H or alkyl, R' and R" are each independently alkyl, A is alkylene, Q is quaternary ammonium, and X is a negatively-charged counter-ion, wherein the liquid or gas phase reaction conditions and the proportions of chlorine and sulfur dioxide are such that the membrane containing said pendant groups has a sulfur content in the range of from about 3 to about 10 wt. % , and a chlorine content in the range of from about 1 to about 25 wt. %, and said membrane is in the form of a module comprising the hollow fiber membranes, both end portions of which are masked from the action of light in the chlorosulfonation reaction, and further comprising a potting material for securing end portions of said hollow fiber membranes.

* * * * *